(12) United States Patent
Lee et al.

(10) Patent No.: US 10,545,661 B2
(45) Date of Patent: Jan. 28, 2020

(54) TOUCH SCREEN DEVICE ALLOWING SELECTIVE INPUT OF FREE LINE, AND METHOD OF SUPPORTING SELECTIVE INPUT OF FREE LINE IN TOUCH SCREEN DEVICE

(71) Applicant: HANCOM FLEXCIL, INC., Seongnam-si, Gyeonggi-do (KR)

(72) Inventors: Changil Lee, Gwangju-si (KR); Hongshik Kim, Seoul (KR)

(73) Assignee: HANCOM FLEXCIL, INC., Seongnam-si, Gyeonggi-do (KR)

( * ) Notice: Subject to any disclaimer, the term of this patent is extended or adjusted under 35 U.S.C. 154(b) by 69 days.

(21) Appl. No.: 15/529,983

(22) PCT Filed: Aug. 8, 2016

(86) PCT No.: PCT/KR2016/008713
§ 371 (c)(1),
(2) Date: May 25, 2017

(87) PCT Pub. No.: WO2017/047930
PCT Pub. Date: Mar. 23, 2017

(65) Prior Publication Data
US 2017/0329509 A1     Nov. 16, 2017

(30) Foreign Application Priority Data

Sep. 17, 2015  (KR) ........................ 10-2015-0131481
Nov. 23, 2015  (KR) ........................ 10-2015-0163738

(51) Int. Cl.
*G06F 3/00*      (2006.01)
*G06F 3/0488*    (2013.01)

(52) U.S. Cl.
CPC .............................. *G06F 3/04883* (2013.01)

(58) Field of Classification Search
CPC .. G06F 3/04842; G06F 3/04812; G06F 3/017; G06F 3/0486; G06F 3/04817;
(Continued)

(56) References Cited

U.S. PATENT DOCUMENTS

2008/0019569 A1    1/2008  Rhoads et al.
2011/0191675 A1*   8/2011  Kauranen ........... G06F 3/04847
                                                            715/702
(Continued)

FOREIGN PATENT DOCUMENTS

JP       2013-232047 A    11/2013
KR    10-2013-0052749 A    5/2013
(Continued)

OTHER PUBLICATIONS

International Search Report in International Application No. PCT/KR2016/008713 dated Nov. 3, 2016.

*Primary Examiner* — Di Xiao
(74) *Attorney, Agent, or Firm* — Park, Kim & Suh, LLC

(57) ABSTRACT

A touch screen device allowing a selective input of a free line according to the present invention first displays, when a user applies a touch input onto a touch screen, a free line according to the touch input on the touch screen, removes the free line when an additional touch input is not applied within a predetermined threshold time, and maintains the display of the free line when an additional touch input having predetermined fixed gesture information is applied onto the touch screen, so that only when the user applies a right touch input onto the touch screen, the touch screen device supports the user to fix the free line input by the user, thereby promoting convenience to the user.

7 Claims, 4 Drawing Sheets

(58) Field of Classification Search
CPC ............ G06F 3/04883; G06F 3/0485; G06F 3/04847; G06F 3/0488; G06F 3/04886; G06F 3/0481; G06F 3/0484; G06F 3/04815; G06F 3/0346; G06F 2203/04803; G06F 3/04845; G06F 2203/04101; G06F 2203/04808; G06F 3/011; G06F 3/013; G06F 3/03547; G06F 3/038; G06F 9/451; G06F 2203/0381; G06F 2203/04104; G06F 3/0416; G06F 3/0487; G06F 9/453; G06F 17/212; G06F 1/1626; G06F 1/163
See application file for complete search history.

(56) References Cited

U.S. PATENT DOCUMENTS

| | | | |
|---|---|---|---|
| 2012/0086662 A1* | 4/2012 | Ashikawa | G06F 3/04883 345/173 |
| 2012/0262386 A1 | 10/2012 | Kwon et al. | |
| 2013/0246970 A1* | 9/2013 | Helle | G06F 3/0482 715/822 |
| 2013/0286435 A1* | 10/2013 | Anezaki | H04N 1/00381 358/1.15 |
| 2014/0055399 A1* | 2/2014 | Lee | G06F 3/03 345/173 |

FOREIGN PATENT DOCUMENTS

| | | |
|---|---|---|
| KR | 10-2014-0027850 A | 3/2014 |
| KR | 10-2014-0069359 A | 6/2014 |

* cited by examiner

TOUCH SCREEN DEVICE ALLOWING SELECTIVE INPUT OF FREE LINE, AND METHOD OF SUPPORTING SELECTIVE INPUT OF FREE LINE IN TOUCH SCREEN DEVICE

CROSS-REFERENCE TO RELATED APPLICATIONS

This application is the National Stage filing under 35 U.S.C. 371 of International Application No. PCT/KR2016/008713, filed on Aug. 8, 2016, which claims the benefits of Korean Patent Application No. 10-2015-0131481, filed on Sep. 17, 2015, and Korean Patent Application No. 10-2015-0163738, filed on Nov. 23, 2015, the contents of which are all hereby incorporated by reference herein in their entirety.

TECHNICAL FIELD

Exemplary embodiments of the present invention relate to technologies for displaying a free line based on a touch input of a user in a touch screen device.

BACKGROUND ART

Recently, as portable smart devices, such as a smart phone or a tablet PC, are widely supplied, various applications utilized in the smart device are released.

Particularly, there are many cases where the smart devices are commonly mounted with touch screens, so that many applications providing interfaces based on a touch input of a user have appeared.

An operation performed by recognizing a touch input of a user in the smart device mounted with the touch screen includes a function of tracing a trace of a movement of a touch input of a user to enable a screen to be scrolled, a function of enlarging or contracting a screen based on a multi-touch input, or the like.

In general, a touch screen device is designed so as to execute a control function according to a corresponding touch input by applying, by a user, a touch input onto a touch screen by using a finger.

However, according to a characteristic of the touch screen, when the user applies a touch input by using the finger, a palm of the user may be in contact with the touch screen, and in this case, the contact by the palm of the user is recognized as a predetermined touch input, so that the touch screen device is erroneously operated in many cases.

In order to prevent an erroneous operation of the touch screen device by the unintended touch input by the palm and the like, a glove for suppressing the generation of static electricity on the palm is released or touch processing technologies which do not process a touch input generated over a wide range on the touch screen as a normal touch input are introduced, but there is a limit in completely preventing the erroneous operation.

Accordingly, when a user desires to input a predetermined free line onto an electronic document and the like displayed through the touch screen device by using a stylus pen or a finger, erroneous free lines may be input by an unintended touch input, such as a touch by a palm, thereby causing inconvenience to the user.

Accordingly, research on a technology for a touch screen device enabling a selective input of a free line, which supports free lines by an unintended touch input not to be input onto the touch screen when the user draws the free line by applying a touch input onto the touch screen is needed.

SUMMARY OF THE INVENTION

Technical Problem

The present invention has been made in an effort to provide a touch screen device allowing a selective input of a free line and a method of supporting a selective input of a free line by the touch screen device, in which when a user applies a touch input onto a touch screen, a free line according to the touch input is first displayed on the touch screen, and when an additional touch input is not applied within a predetermined threshold time, the free line is removed, and when an additional touch input having predetermined fixed gesture information is applied onto the touch screen, the display of the free line is maintained, so that only when the user applies a right touch input onto the touch screen, the user is supported to fix the free line input by the user, thereby promoting convenience to the user.

Technical Solution

An exemplary embodiment of the present invention provides a touch screen device allowing a selective input of a free line, the touch screen device including: a free line display unit which, when a user applies a touch input onto a touch screen, tracks a trace of the touch input and displays a free line according to the trace of the touch input on the touch screen; an additional touch determining unit which determines whether an additional touch input is applied onto the touch screen until a predetermined threshold time elapses after the touch input is applied onto the touch screen; and a free line display controller which, when the additional touch input is not applied onto the touch screen until the predetermined threshold time elapses after the touch input is applied onto the touch screen, executes a removal event for removing the free line displayed through the touch screen and removes the free line displayed through the touch screen.

Another exemplary embodiment of the present invention provides a method of supporting a selective input of a free line in a touch screen device, the method including: when a user applies a touch input onto a touch screen, tracking a trace of the touch input and displaying a free line according to the trace of the touch input on the touch screen; determining whether an additional touch input is applied onto the touch screen until a predetermined threshold time elapses after the touch input is applied onto the touch screen; and when the additional touch input is not applied onto the touch screen until the predetermined threshold time elapses after the touch input is applied onto the touch screen, executing a removal event for removing the free line displayed through the touch screen and removing the free line displayed through the touch screen.

Advantageous Effects

According to the touch screen device allowing a selective input of a free line and the method of supporting a selective input of a free line by the touch screen device according to the present invention, when a user applies a touch input onto a touch screen, a free line according to the touch input is first displayed on the touch screen, and when an additional touch input is not applied within a predetermined threshold time, the free line is removed, and when an additional touch input having predetermined fixed gesture information is applied onto the touch screen, the display of the free line is maintained, so that only when the user applies a right touch input onto the touch screen, the user is supported to fix the free line input by the user, thereby promoting convenience to the user.

DETAILED DESCRIPTION

Figure 1:
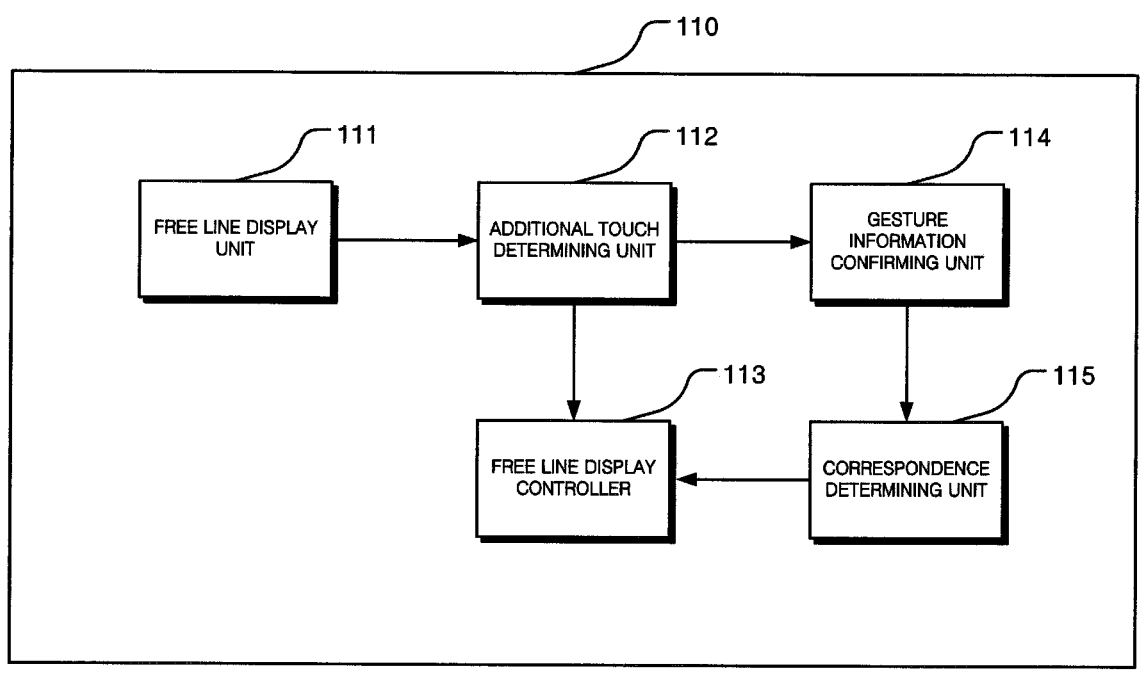
FIG. 1 is a diagram illustrating a structure of a touch screen device allowing a selective input of a free line according to an exemplary embodiment of the present invention.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

When a component is referred to as being "connected" or "accessed" to another component, it should be understood that the component may not only be directly connected or accessed to the other component, but intervening components may also be present. In contrast, when a component is referred to as being "directly connected to" or "directly accessed to" another component, it should be understood that there are no intervening component present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, components, and elements described in the specification or a combination thereof, and do not exclude a possibility of the existence or addition of one or more other characteristics, numbers, steps, operations, components, and elements, or a combination thereof in advance.

All terms used herein including technical or scientific terms have the same meanings as meanings which are generally understood by those skilled in the art unless they are differently defined. It should be construed that terms defined in a generally used dictionary have meanings matching those in the context of a related art, and the terms shall not be construed in ideal or excessively formal meanings unless they are clearly defined in the present application.

Hereinafter, exemplary embodiments of the present invention will be described in detail with reference to the accompanying drawings.

FIG. 1 is a diagram illustrating a structure of a touch screen device allowing a selective input of a free line according to an exemplary embodiment of the present invention.

Referring to FIG. 1, a touch screen device 110 allowing a selective input of a free line according to an exemplary embodiment of the present invention includes a free line display unit 111, an additional touch determining unit 112, and a free line display controller 113.

When a user applies a touch input onto a touch screen, the free line display unit 111 tracks a trace of the touch input and displays a free line according to the trace of the touch input on the touch screen.

The additional touch determining unit 112 determines whether an additional touch input is applied onto the touch screen until a predetermined threshold time elapses after the touch input is applied onto the touch screen.

When the additional touch input is not applied onto the touch screen until the predetermined threshold time elapses after the touch input is applied onto the touch screen, the free line display controller 113 executes a removal event for removing the free line displayed through the touch screen and removes the free line displayed through the touch screen.

In this case, according to the exemplary embodiment of the present invention, the touch screen device 110 allowing the selective input of the free line may further include a gesture information confirming unit 114 and a correspondence determining unit 115.

When the additional touch input is applied onto the touch screen before the predetermined threshold time elapses after the touch input is applied onto the touch screen, the gesture information confirming unit 114 tracks a trace of the additional touch input and confirms gesture information according to the additional touch input.

The correspondence determining unit 115 determines whether the gesture information according to the additional touch input corresponds to predetermined fixed gesture information.

In this case, when it is determined that the gesture information according to the additional touch input corresponds to the predetermined fixed gesture information, the free line display controller 113 may execute a maintenance event for the free line displayed through the touch screen and maintain the display of the free line displayed through the touch screen on the touch screen.

In this case, according to the exemplary embodiment of the present invention, when it is determined that the gesture information according to the additional touch input does not correspond to the predetermined fixed gesture information, the free line display unit 111 may display an additional free line according to the trace of the additional touch input on the touch screen.

Figure 2:
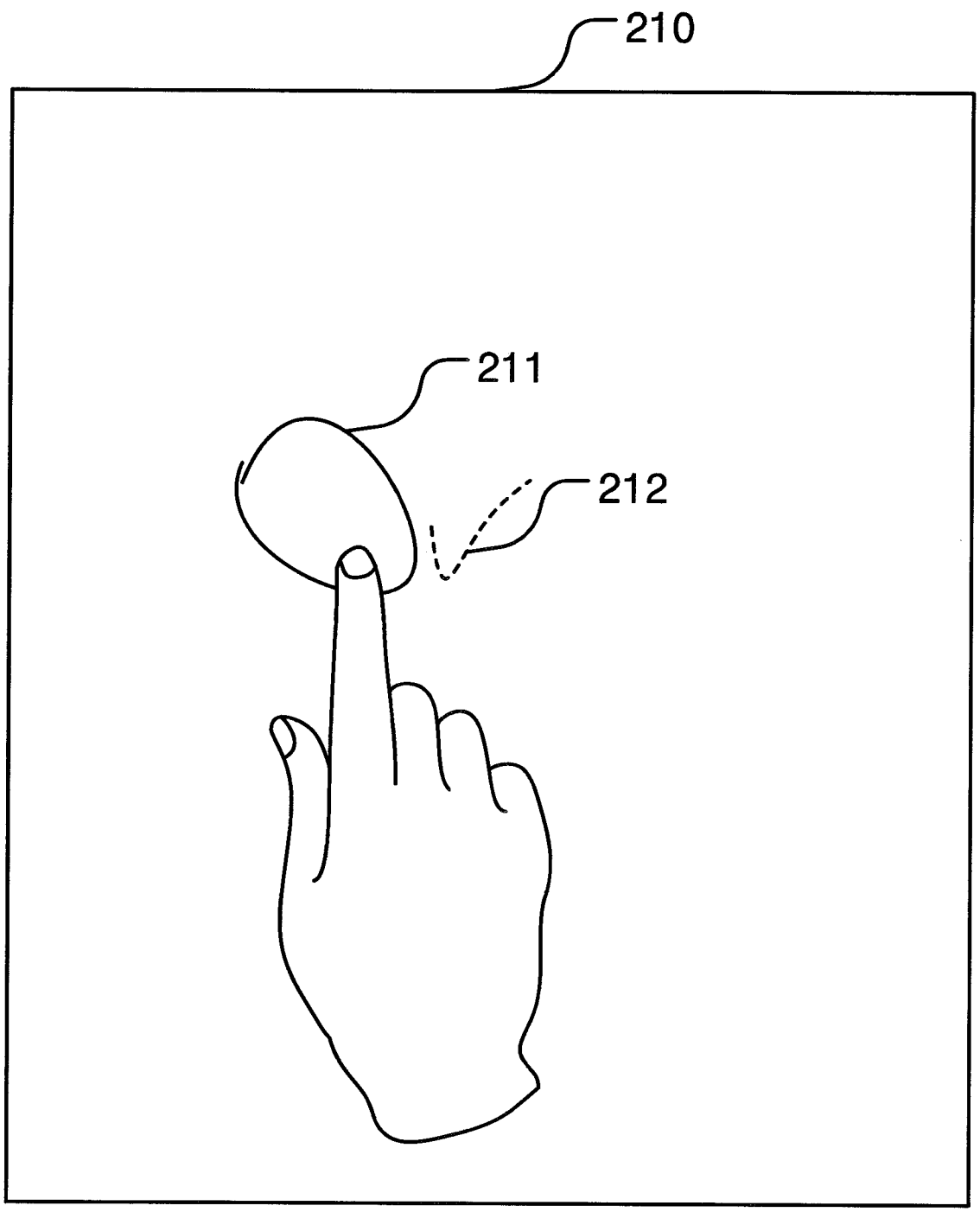
FIGS. 2 and 3 are diagrams for describing an operation of the touch screen device allowing the selective input of the free line according to the exemplary embodiment of the present invention.
Figure 3:
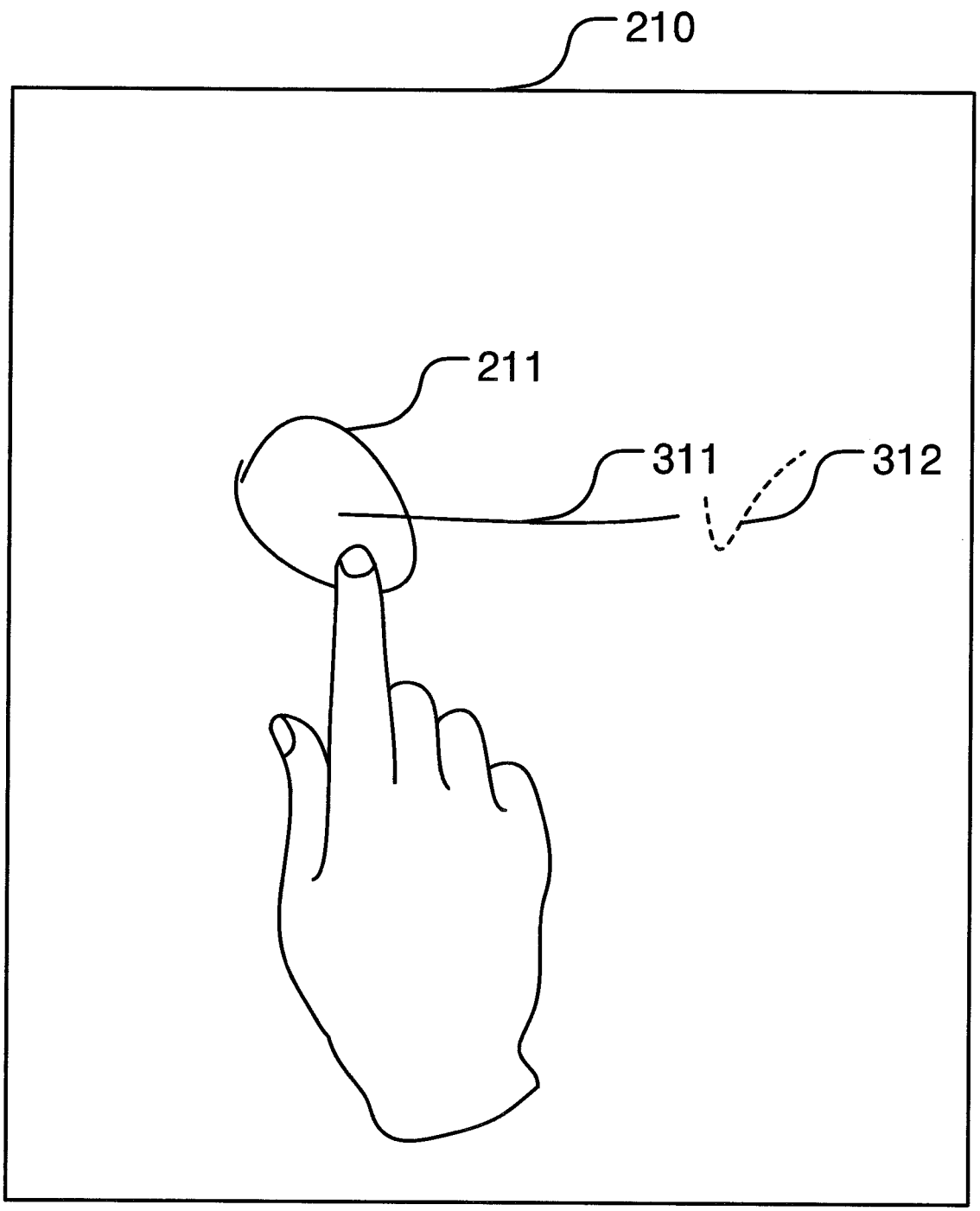

In this case, the additional touch determining unit 112 may re-determine whether another additional touch input is applied onto the touch screen until the predetermined threshold time elapses after the additional touch input is applied onto the touch screen, and when another additional touch input is not applied onto the touch screen until the predetermined threshold time elapses after the additional touch input is applied onto the touch screen, the free line display controller 113 may execute the removal event for removing the free line and the additional free line displayed through the touch screen, and remove the free line and the additional free line displayed through the touch screen, Hereinafter, an operation of the touch screen device 110 allowing the selective input of the free line according to the present invention will be described in detail based on an example with reference to FIGS. 2 and 3.

FIGS. 2 and 3 are diagrams for describing an operation of the touch screen device 110 allowing the selective input of the free line according to the exemplary embodiment of the present invention.

First, as illustrated in FIG. 2, when a user applies a circular touch input onto a touch screen 210, the free line display unit 111 may track a trace of the circular touch input and display a free line 211 according to the trace of the circular touch input on the touch screen 210.

When the free line 211 is displayed on the touch screen 210 as described above, the additional touch determining unit 112 may determine whether an additional touch input is applied onto the touch screen 210 until a predetermined threshold time elapses after the touch input is applied onto the touch screen 210.

Herein, when it is assumed that the predetermined threshold time is "two seconds", the additional touch determining unit 112 may determine whether an additional touch input is applied onto the touch screen 210 until "two seconds" elapses after the touch input is applied onto the touch screen 210.

When the additional touch input is not applied onto the touch screen 210 until the predetermined threshold time elapses after the touch input is applied onto the touch screen 210, the free line display controller 113 may execute a removal event for removing the free line 211 displayed through the touch screen 210 and remove the free line 211 displayed through the touch screen 210.

Accordingly, when the free line 211 input onto the touch screen 210 is the erroneously input free line or the free line by an unintended touch, the user does not input any touch input onto the touch screen 210 until the predetermined threshold time elapses to let the free line 211 disappear on the touch screen 210.

However, when the user applies an additional touch input onto the touch screen 210 before the predetermined threshold time elapses after the touch input is applied onto the touch screen 210, the free line 211 displayed through the touch screen 210 is not removed, and the gesture information confirming unit 114 tracks a trace of the additional touch input and confirms gesture information according to the additional touch input.

Then, the correspondence determining unit 115 may determine whether the gesture information according to the additional touch input corresponds to predetermined fixed gesture information.

In the present exemplary embodiment, when it is assumed that the predetermined fixed gesture information is information on a "V"-shaped gesture denoted with reference numeral 212 and the additional touch input applied by the user onto the touch screen 210 is a touch input having a trace denoted with reference numeral 212, the gesture information confirming unit 114 may track the trace of the additional touch input and confirm the V-shaped gesture information as gesture information according to the additional touch input.

In this case, the correspondence determining unit 115 may determine whether the gesture information according to the additional touch input corresponds to the predetermined fixed gesture information.

In this case, when it is determined that the gesture information according to the additional touch input corresponds to the predetermined fixed gesture information, the free line display controller 113 may execute a maintenance event for the free line 211 displayed through the touch screen 210 and maintain the display of the free line 211 displayed through the touch screen 210 on the touch screen 210.

That is, in the present exemplary embodiment, when the user applies an additional touch input having gesture information which has the shape denoted with reference numeral 212 and corresponds to the predetermined fixed gesture information onto the touch screen 210 before the predetermined threshold time elapses after the user inputs the free line 211 into the touch screen 210, the free line display controller 113 may not remove the free line 211 on the touch screen 210, and may control the free line 211 to be maintained in a state of being fixedly input into the touch screen 210 and displayed on the touch screen 210.

When the user applies an additional touch input onto the touch screen 210 before the predetermined threshold time elapses after the user inputs the free line 211 into the touch screen 210, in which the user does not apply the additional touch input having the shape denoted with reference numeral 212, but applies the additional touch input having a trace shifting from the left side to the right side denoted with reference numeral 311 as illustrated in FIG. 3, the additional touch input input by the user is not the touch input having the gesture information corresponding to the predetermined fixed gesture information, so that the free line display controller 113 does not execute a maintenance event for the free line 211 displayed through the touch screen 210, but the free line display unit 111 displays an additional free line 311 according to the trace of the additional touch input on the touch screen 210.

The additional touch determining unit 112 may re-determine whether another additional touch input is applied onto the touch screen 210 until the predetermined threshold time elapses after the additional touch input is applied onto the touch screen 210.

When another additional touch input is not applied onto the touch screen 210 until the predetermined threshold time elapses after the additional touch input is applied onto the touch screen 210, the free line display controller 113 may execute a removal event for removing the free line 211 and the additional free line 311 displayed through the touch screen 210 and remove the free line 211 and the additional free line 311 displayed through the touch screen 210.

That is, when the user applies a touch input for the free line 211 onto the touch screen 210 and applies a touch input for the additional free line 311 within the predetermined threshold time, both the free line 211 and the additional free line 311 are first displayed on the touch screen 210, and when the user does not apply any touch within the predetermined threshold time after that, both the free line 211 and the additional free line 311 displayed on the touch screen 210 are removed by the free line display controller 113.

However, when the user applies another additional touch input onto the touch screen 210 within the predetermined threshold time after the additional free line 311 is displayed on the touch screen 210, and another additional touch input is the touch input having the V-shaped gesture information denoted with reference numeral 312, the gesture information confirming unit 114 may track a trace of another additional touch input and confirm the V-shaped gesture information as the gesture information according to another additional touch input, and the correspondence determining unit 115 may determine that the gesture information according to another additional touch input corresponds to the predetermined fixed gesture information.

In this case, since it is determined that the gesture information according to another additional touch input corresponds to the predetermined fixed gesture information, the free line display controller 113 may execute the maintenance event for the free line 211 and the additional free line 311 displayed through the touch screen 210 and maintain the display of the free line 211 and the additional free line 311 displayed through the touch screen 210 on the touch screen 210.

That is, in the present exemplary embodiment, when the user inputs the additional free line 311 into the touch screen 210 before the predetermined threshold time elapses after inputting the free line 211 into the touch screen 210, and then the user applies another additional touch input having gesture information which has the shape denoted with reference numeral 312 and corresponds to the predetermined fixed gesture information before the predetermined threshold time elapses, the free line display controller 113 may not remove the free line 211 and the additional free line 311 on the touch screen 210, and may control the free line 211 and the additional free line 311 to be maintained in a state of being fixedly input into the touch screen 210 and displayed on the touch screen 210.

Finally, the touch screen device 110 allowing the selective input of the free line according to the present invention first displays, when a user applies a touch input onto a touch screen, a free line according to the touch input on the touch screen, removes the free line when an additional touch input is not applied within a predetermined threshold time, and maintains the display of the free line when an additional touch input having predetermined fixed gesture information is applied onto the touch screen, so that only when the user applies a right touch input onto the touch screen, the touch screen device 110 supports the user to fix the free line input by the user, thereby promoting convenience to the user.

According to the exemplary embodiment of the present invention, when the maintenance, event for the free line displayed through the touch screen is executed and a fixed cancel touch input having gesture information corresponding to predetermined fixed cancel gesture information is applied onto the touch screen before a predetermined cancel allowable threshold time elapses from a time of the input of the additional touch input onto the touch screen, the free line display controller 113 may cancel the execution of the maintenance event for the free line 211 based on the fixed cancel touch input.

In this case, the additional touch determining unit 112 may re-determine whether another additional touch input is applied onto the touch screen until the predetermined threshold time elapses after the fixed cancel touch input is applied onto the touch screen, and when another additional touch input is not applied onto the touch screen until the predetermined threshold time elapses after the fixed cancel touch input is applied onto the touch screen, the free line display controller 113 may execute the removal event for removing the free line displayed through the touch screen, and remove the free line displayed through the touch screen.

In relation to this, like the example illustrated in FIG. 2, it is assumed that the user applies a touch input onto the touch screen 210, so that the free line 211 is displayed on the touch screen 210, and then the user applies an additional touch input having predetermined fixed gesture information denoted with reference numeral 212 onto the touch screen 210 within predetermined threshold time, so that the free line display controller 113 executes the maintenance event for the free line 211.

In this case, when the user cancels the maintenance event for the free line 211, and the user applies a fixed cancel touch input having gesture information corresponding to predetermined fixed cancel gesture information before a predetermined cancel allowable threshold time elapses after the additional touch input having the predetermined fixed gesture information denoted with reference numeral 212 is applied onto the touch screen 210, in order to return to a state where the free line 211 is automatically removed after a predetermined time elapses, the free line display controller 113 may cancel the execution of the maintenance event for the free line 211 based on the fixed cancel touch input.

For example, in the case where the predetermined cancel allowable threshold time is "one second", and the fixed cancel gesture information is information about a "^" shaped gesture, when the user applies the additional touch input having the "V" shaped fixed gesture information denoted with reference numeral 212 onto the touch screen 210 and then applies a fixed cancel touch input having the "^" shaped gesture information within "one second", the free line display controller 113 may cancel the execution of the maintenance event for the free line based on the fixed cancel touch input.

Then, the additional touch determining unit 112 may re-determine whether another additional touch input is applied onto the touch screen 210 until the predetermined threshold time elapses after the fixed cancel touch input is applied onto the touch screen 210, and when another additional touch input is not applied onto the touch screen 210 until the predetermined threshold time elapses after the fixed cancel touch input is applied onto the touch screen 210, the free line display controller 113 may execute the removal event for removing the free line 211 displayed through the touch screen 210 and remove the free line 211 displayed through the touch screen 210.

In the foregoing exemplary embodiment, the case where when the user applies a touch input onto the touch screen and a free line according to the touch input is displayed on the touch screen, the display of the free line is continuously maintained only when the user applies an additional touch input having predetermined fixed gesture information within a predetermined threshold time thereafter has been described. That is, in the foregoing exemplary embodiment, the user may generate free lines by applying a predetermined touch input onto the touch screen, and when the user desires to fix the display of the corresponding free lines, the user needs to apply an additional touch input having fixed gesture information onto the touch screen to fix the display of the corresponding free lines.

However, the touch screen device 110 allowing the selective input of the free line according to another exemplary embodiment of the present invention may also be formed so that when a user applies a touch input onto the touch screen, so that a predetermined free line is displayed, and then the user applies an additional touch input having the predetermined fixed gesture information one time onto the touch screen within the predetermined threshold time, the display of the free line is continuously maintained, and simultaneously, even when the user does not separately apply a touch input having the predetermined fixed gesture information for the free lines according to all of the subsequently input touch inputs, the display of the free lines is maintained.

In relation to this, according to the exemplary embodiment of the present invention, the user applies an additional touch input onto the touch screen within a predetermined threshold time after a free line is displayed on the touch screen through the free line display unit 111 according to the application of the touch input onto the touch screen, and in this case, when it is determined that gesture information according to the additional touch input corresponds to the predetermined fixed gesture information, the free line display controller 113 may execute a shift event to a writing mode, and control the display of the free lines for all of the touch inputs applied within the predetermined threshold time after the additional touch input is applied onto the touch screen to be maintained on the touch screen regardless of the application and the non-application of the touch input having the predetermined fixed gesture information.

That is, when an operation mode is switched to the writing mode through the free line display controller 113, even though the user does not separately apply the touch input having the predetermined fixed gesture information for the free lines according to the corresponding touch inputs, the display of the free lines may be continuously maintained on the touch screen only with the application of the touch inputs by the user onto the touch screen within the predetermined threshold time.

In this case, according to the exemplary embodiment of the present invention, the touch screen device 110 allowing the selective input of the free line may further include a configuration which maintains the display of the corresponding free lines only when the user desires to display the free lines after the switching of the operation mode to the writing mode and the touch input having the predetermined fixed gesture information for the input free lines is applied, and supports the writing mode to be re-switched to a mode of removing the corresponding lines when an additional touch input is not applied until a predetermined threshold time elapses after the input of the free lines.

In relation to this, when a final touch input is applied onto the touch screen and any touch input is not applied until the predetermined threshold time elapses after the switch event to the writing mode is executed, the free line display controller 113 may execute a switch event to a protection mode, and control the display of free lines for touch inputs input onto the touch screen after the execution of the switch event to the protection mode to be removed from the touch screen when the touch input having the predetermined fixed gesture information is not input.

That is, when the user does not apply a predetermined additional touch input within the predetermined threshold time after the user applies a final touch input onto the touch screen after the switching of the operation mode to the writing mode, the free line display controller 113 may execute the switch event to the protection mode and convert an operation mode so that in order to continuously maintain the display of corresponding free lines by inputting the new free lines onto the touch screen, the user needs to apply a separate touch input having the fixed gesture information again.

Figure 4:
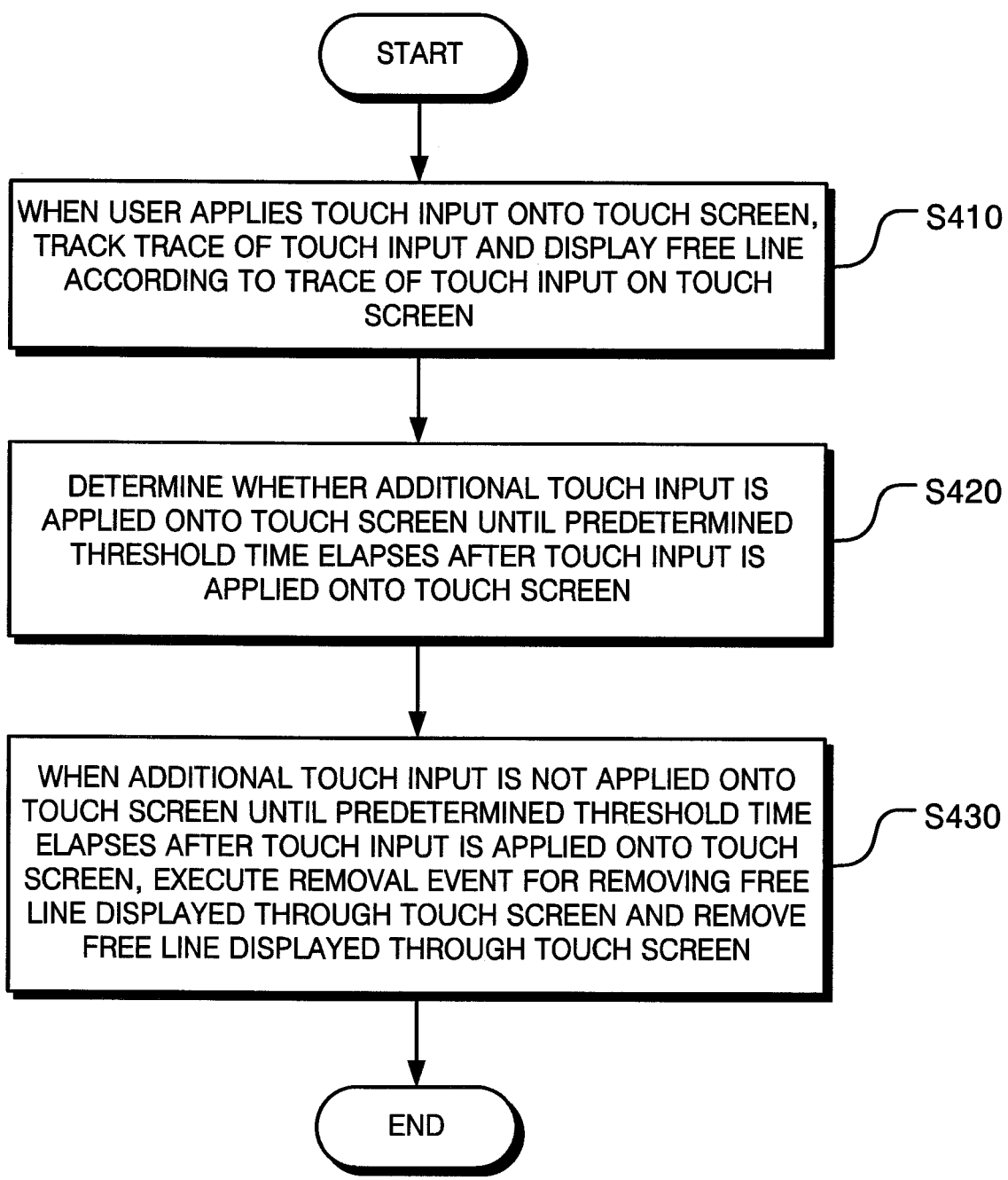
FIG. 4 is a flowchart illustrating a method of supporting a selective input of a free line in a touch screen device according to an exemplary embodiment of the present invention.

FIG. 4 is a flowchart illustrating a method of supporting a selective input of a free line in a touch screen device according to an exemplary embodiment of the present invention.

In operation S410, when a user applies a touch input onto a touch screen, a trace of the touch input is tracked and a free line according to the trace of the touch input is displayed on the touch screen.

In operation S420, it is determined whether an additional touch input is applied onto the touch screen until a predetermined threshold time elapses after the touch input is applied onto the touch screen.

In operation S430, when the additional touch input is not applied onto the touch screen until the predetermined threshold time elapses after the touch input is applied onto the touch screen, a removal event for removing the free line displayed through the touch screen is executed and the free line displayed through the touch screen is removed.

In the case, according to the exemplary embodiment of the present invention, the method of supporting the selective input of the free line in the touch screen device may further include: when the additional touch input is applied onto the touch screen before the predetermined threshold time elapses after the touch input is applied onto the touch screen, tracking a trace of the additional touch input and confirming gesture information according to the additional touch input; determining whether the gesture information according to the additional touch input corresponds to predetermined fixed gesture information; and when it is determined that the gesture information according to the additional touch input corresponds to the predetermined fixed gesture information, executing a maintenance event for the free line displayed through the touch screen and maintaining the display of the free line displayed through the touch screen on the touch screen.

In the case, according to the exemplary embodiment of the present invention, the method of supporting the selective input of the free line in the touch screen device may further include: when it is determined that the gesture information according to the additional touch input does not correspond to the predetermined fixed gesture information, displaying an additional free line according to the trace of the additional touch input on the touch screen; re-determining whether another additional touch input is applied onto the touch screen until the predetermined threshold time elapses after the additional touch input is applied onto the touch screen; and when another additional touch input is not applied onto the touch screen until the predetermined threshold time elapses after the additional touch input is applied onto the touch screen, executing a removal event for removing the free line and the additional free line displayed through the touch screen, and removing the free line and the additional free line displayed through the touch screen.

According to the exemplary embodiment of the present invention, the method of supporting the selective input of the free line in the touch screen device may further include: when the maintenance event for the free line displayed through the touch screen is executed and when a fixed cancel touch input having gesture information corresponding to predetermined fixed cancel gesture information is applied onto the touch screen before a predetermined cancel allowable threshold time elapses from a time of the input of the additional touch input onto the touch screen, cancelling the execution of the maintenance event for the free line based on the fixed cancel touch input; re-determining whether another additional touch input is applied onto the touch screen until the predetermined threshold time elapses after the fixed cancel touch input is applied onto the touch screen; and when another additional touch input is not applied onto the touch screen until the predetermined threshold time elapses after the fixed cancel touch input is applied onto the touch screen, executing the removal event for removing the free line displayed through the touch screen, and removing the free line displayed through the touch screen.

In the case, according to the exemplary embodiment of the present invention, the method of supporting the selective input of the free line in the touch screen device may further include: when it is determined that gesture information according to the additional touch input corresponds to the predetermined fixed gesture information, executing a shift event to a writing mode, and controlling the display of the free lines for all of the touch inputs applied within the predetermined threshold time after the additional touch input is applied onto the touch screen to be maintained on the touch screen regardless of the application and the non-application of the touch input having the predetermined fixed gesture information.

In the case, according to the exemplary embodiment of the present invention, the method of supporting the selective input of the free line in the touch screen device may further include: when a final touch input is applied onto the touch screen and any touch input is not applied until the predetermined threshold time elapses after a switch event to the writing mode is executed, executing a switch event to a protection mode, and controlling the display of free lines for touch inputs input onto the touch screen after the execution of the switch event to the protection mode to be removed from the touch screen when the touch input having the predetermined fixed gesture information is not input.

In the foregoing, the method of supporting the selective input of the free line in the touch screen device according to the exemplary embodiment of the present invention has been described with reference to FIG. 4. Herein, the method of supporting the selective input of the free line in the touch screen device according to the exemplary embodiment of the present invention may correspond to the configuration of the operation of the touch screen device 110 allowing the selective input of the free line described with reference to FIGS. 1 to 3, so that a more detailed description thereof will be omitted.

The method of supporting the selective input of the free line in the touch screen device according to the exemplary embodiment of the present invention may be implemented with a computer program stored in a storage medium for executing the method in cooperation with a computer.

The method of supporting the selective input of the free line in the touch screen device according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A touch screen device allowing a selective input of a free line, the touch screen device comprising:
   a free line display unit which, when a user applies a touch input onto a touch screen, tracks a trace of the touch input and displays a free line according to the trace of the touch input on the touch screen;
   an additional touch determining unit which determines whether an additional touch input is applied onto the touch screen until a predetermined threshold time elapses after the touch input is applied onto the touch screen;
   a free line display controller which, when the additional touch input is not applied onto the touch screen until the predetermined threshold time elapses after the touch input is applied onto the touch screen, executes a removal event for removing the free line displayed through the touch screen and removes the free line displayed through the touch screen;
   a gesture information confirming unit which, when the additional touch input is applied onto the touch screen before the predetermined threshold time elapses after the touch input is applied onto the touch screen, tracks a trace of the additional touch input and confirms gesture information according to the additional touch input; and
   a correspondence determining unit which determines whether the gesture information according to the additional touch input corresponds to predetermined fixed gesture information designated to confirm the displayed free line,
   wherein when it is determined that the gesture information according to the additional touch input corresponds to the predetermined fixed gesture information, the free line display controller executes a maintenance event for the free line displayed through the touch screen and maintains the display of the free line displayed through the touch screen on the touch screen,
   wherein the free line display controller displays and maintains free lines for all touch inputs applied after a completion of the additional touch input of which the gesture information corresponds to the predetermined fixed gesture information, without a further application of any touch input having the predetermined fixed gesture information after the completion of the additional touch input, and the predetermined fixed gesture information is a V-shaped gesture, and
   wherein when any touch input is not applied until the predetermined threshold time elapses after the completion of the additional touch input, the free line display controller executes a switch event to a protection mode, and in the protection mode, the free line display controller controls a display of free lines for touch inputs after the execution of the switch event to the protection mode to be removed from the touch screen when a touch input having the predetermined fixed gesture information is not applied.

2. The touch screen device of claim 1, wherein when it is determined that the gesture information according to the additional touch input does not correspond to the predetermined fixed gesture information, the free line display unit displays an additional free line according to the trace of the additional touch input on the touch screen, the additional touch determining unit re-determines whether another additional touch input is applied onto the touch screen until the predetermined threshold time elapses after the additional touch input is applied onto the touch screen, and when another additional touch input is not applied onto the touch screen until the predetermined threshold time elapses after the additional touch input is applied onto the touch screen, the free line display controller executes a removal event for removing the free line and the additional free line displayed through the touch screen, and removes the free line and the additional free line displayed through the touch screen.

3. The touch screen device of claim 1, wherein when the maintenance event for the free line displayed through the touch screen is executed and a fixed cancel touch input having gesture information corresponding to predetermined fixed cancel gesture information is applied onto the touch screen before a predetermined cancel allowable threshold time elapses from a time of the input of the additional touch input onto the touch screen, the free line display controller cancels the execution of the maintenance event for the free line based on the fixed cancel touch input, the additional touch determining unit re-determines whether another additional touch input is applied onto the touch screen until the predetermined threshold time elapses after the fixed cancel touch input is applied onto the touch screen, and when another additional touch input is not applied onto the touch screen until the predetermined threshold time elapses after the fixed cancel touch input is applied onto the touch screen, the free line display controller executes the removal event for removing the free line displayed through the touch screen, and removes the free line displayed through the touch screen.

4. A method of supporting a selective input of a free line in a touch screen device, the method comprising:

when a user applies a touch input onto a touch screen, tracking a trace of the touch input and displaying a free line according to the trace of the touch input on the touch screen;

determining whether an additional touch input is applied onto the touch screen until a predetermined threshold time elapses after the touch input is applied onto the touch screen;

when the additional touch input is not applied onto the touch screen until the predetermined threshold time elapses after the touch input is applied onto the touch screen, executing a removal event for removing the free line displayed through the touch screen and removing the free line displayed through the touch screen;

when the additional touch input is applied onto the touch screen before the predetermined threshold time elapses after the touch input is applied onto the touch screen, tracking a trace of the additional touch input and confirming gesture information according to the additional touch input;

determining whether the gesture information according to the additional touch input corresponds to predetermined fixed gesture information designated to confirm the displayed free line;

when it is determined that the gesture information according to the additional touch input corresponds to the predetermined fixed gesture information, executing a maintenance event for the free line displayed through the touch screen and maintaining the display of the free line displayed through the touch screen on the touch screen;

displaying and maintaining free lines for all touch inputs applied after a completion of the additional touch input of which the gesture information corresponds to the predetermined fixed gesture information, without a further application of any touch input having the predetermined fixed gesture information after the completion of the additional touch input, wherein the predetermined fixed gesture information is a V-shaped gesture; and wherein when any touch input is not applied until the predetermined threshold time elapses after the completion of the additional touch input, executing a switch event to a protection mode, and in the protection mode, controlling a display of free lines for touch inputs after the execution of the switch event to the protection mode to be removed from the touch screen when a touch input having the predetermined fixed gesture information is not applied.

5. The method of claim 4, further comprising:

when it is determined that the gesture information according to the additional touch input does not correspond to the predetermined fixed gesture information, displaying an additional free line according to the trace of the additional touch input on the touch screen;

re-determining whether another additional touch input is applied onto the touch screen until the predetermined threshold time elapses after the additional touch input is applied onto the touch screen; and when another additional touch input is not applied onto the touch screen until the predetermined threshold time elapses after the additional touch input is applied onto the touch screen, executing a removal event for removing the free line and the additional free line displayed through the touch screen, and removing the free line and the additional free line displayed through the touch screen.

6. The method of claim 4, further comprising:

when the maintenance event for the free line displayed through the touch screen is executed and a fixed cancel touch input having gesture information corresponding to predetermined fixed cancel gesture information is applied onto the touch screen before a predetermined cancel allowable threshold time elapses from a time of the input of the additional touch input onto the touch screen, cancelling the execution of the maintenance event for the free line based on the fixed cancel touch input;

re-determining whether another additional touch input is applied onto the touch screen until the predetermined threshold time elapses after the fixed cancel touch input is applied onto the touch screen; and when another additional touch input is not applied onto the touch screen until the predetermined threshold time elapses after the fixed cancel touch input is applied onto the touch screen, executing the removal event for removing the free line displayed through the touch screen, and removing the free line displayed through the touch screen.

7. A non-transitory computer readable recording medium in which a program for executing a method of supporting a selective input of a free line in a touch screen device is recorded, the method comprising:

when a user applies a touch input onto a touch screen, tracking a trace of the touch input and displaying a free line according to the trace of the touch input on the touch screen;

determining whether an additional touch input is applied onto the touch screen until a predetermined threshold time elapses after the touch input is applied onto the touch screen;

when the additional touch input is not applied onto the touch screen until the predetermined threshold time elapses after the touch input is applied onto the touch screen, executing a removal event for removing the free line displayed through the touch screen and removing the free line displayed through the touch screen;

when the additional touch input is applied onto the touch screen before the predetermined threshold time elapses after the touch input is applied onto the touch screen, tracking a trace of the additional touch input and confirming gesture information according to the additional touch input;

determining whether the gesture information according to the additional touch input corresponds to predetermined fixed gesture information designated to confirm the displayed free line;

when it is determined that the gesture information according to the additional touch input corresponds to the predetermined fixed gesture information, executing a maintenance event for the free line displayed through the touch screen and maintaining the display of the free line displayed through the touch screen on the touch screen:

displaying and maintaining free lines for all touch inputs applied after a completion of the additional touch input of which the gesture information corresponds to the predetermined fixed gesture information, without a further application of any touch input having the predetermined fixed gesture information after the completion of the additional touch input, wherein the predetermined fixed gesture information is a V-shaped gesture: and wherein when any touch input is not applied until the predetermined threshold time elapses after the completion of the additional touch input, executing a switch event to a protection mode, and in the protection mode, controlling a display of free lines for touch inputs after the execution of the switch event to the protection mode to be removed from the touch screen when a touch input having the predetermined fixed gesture information is not applied.

* * * * *